(12) United States Patent
Suino

(10) Patent No.: US 6,987,879 B1
(45) Date of Patent: Jan. 17, 2006

(54) METHOD AND SYSTEM FOR EXTRACTING INFORMATION FROM IMAGES IN SIMILAR SURROUNDING COLOR

(75) Inventor: Tooru Suino, Kanagawa (JP)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/573,777

(22) Filed: May 18, 2000

(30) Foreign Application Priority Data

May 26, 1999 (JP) .......................... 11-146404

(51) Int. Cl.
*G06K 9/00* (2006.01)

(52) U.S. Cl. .................. 382/165; 382/170; 382/172; 382/176; 358/466

(58) Field of Classification Search ......... 382/162–173, 382/176, 192, 237; 358/466
See application file for complete search history.

(56) References Cited

U.S. PATENT DOCUMENTS

| | | | | |
|---|---|---|---|---|
| 4,656,665 A | * | 4/1987 | Pennebaker | 382/172 |
| 6,023,526 A | * | 2/2000 | Kondo et al. | 382/165 |
| 6,115,491 A | * | 9/2000 | Rudd et al. | 382/154 |
| 6,233,354 B1 | * | 5/2001 | Nakatani | 382/224 |
| 6,324,302 B1 | * | 11/2001 | Sugiura | 382/173 |

FOREIGN PATENT DOCUMENTS

JP 08123901 5/1996

OTHER PUBLICATIONS

"Recognition of Chinese Business Cards" by Yaw–Huei Chiou et al. 1997 IEEE, Procedings of the Fourth International Conference pp. 1028–1032.*
U.S. Appl. No. 00/487,340, filed on Jan. 19, 2000, titled: A Method, Computer Readable Medium and Apparatus for Extracting Characters from Color Image Data.

* cited by examiner

*Primary Examiner*—Jon Chang
*Assistant Examiner*—Charles Kim
(74) *Attorney, Agent, or Firm*—Knoble Yoshida & Dunleavy

(57) ABSTRACT

Characters or image portions are extracted from a background whose color is similar to that of the characters or the image portions. In order to chromatically isolate the characters and the image portions, a threshold value used for binarization is adjusted as the binarization is repeated as necessary or for a predetermined number of times. The adjusted threshold value allows the chromatic isolation of similar colors.

18 Claims, 11 Drawing Sheets

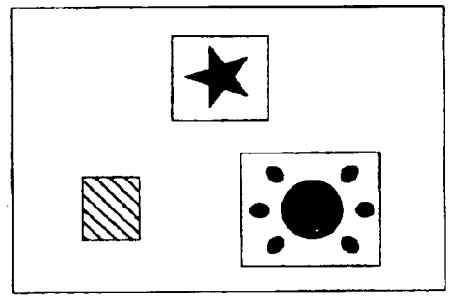
PLANE DIVISION BINARIZATION
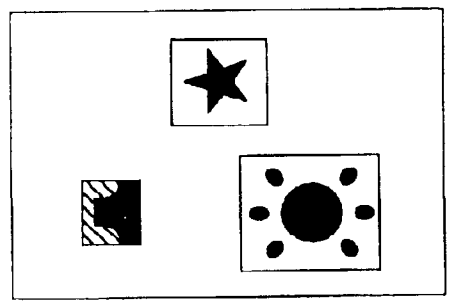
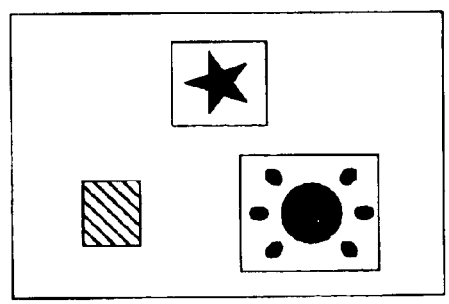
FIG. 2
(PRIOR ART)

METHOD AND SYSTEM FOR EXTRACTING INFORMATION FROM IMAGES IN SIMILAR SURROUNDING COLOR

FIELD OF THE INVENTION

The current invention is generally related to image information extraction, and more particularly related to a method and a system for extracting information from images whose color is similar to one surrounding the images.

BACKGROUND OF THE INVENTION

A character extraction technology is used in a character recognition system such as in an optical character reading apparatus for processing an image document. The character extraction technology is also used in an image editing system to delete a character from a graphic image. In the present invention, the term "character" includes alphabetic letters, Arabian numerals, Roman numerals, Kana characters, Kanji or Chinese characters, Arabian characters.

Japanese Laid-Open Patent Publication No. 08-123901 discloses a character extraction and recognition device. The device has a color image input device, a color space converting device, a color space dividing device, an image data to binary data converting device, a character extraction device, and a character recognition device. In the character extraction and recognition device, the input color image is divided into a plurality of color ranges, and characters are extracted using the divided color ranges. The character extraction and recognition device fails to disclose a method for simultaneously extracting plural color characters.

A related application U.S. Patent Application Serial Number) by the assignee of the current application has disclosed a system for simultaneously extracting characters in multiple colors from color image data. The color components such as Red, Green and Blue of the image data are simultaneously processed to generate bi-level color component data. As long as the character colors and the background color has a sharp contrast in color, the above described binarization is able to extract the characters.

Color documents and color visual mediums such as color printed matters, color photocopies and web pages in the Internet have become more widely used, and the use of colors has been extended. For example, web pages in the Internet are filled with characters in various colors in backgrounds in also various colors.

Referring to FIG. 1, a conventional method fails to extract certain color characters from a certain color background for character recognition. A sample image has three rows of characters including a row one having red characters in a black background. The second and third rows have dark characters in the white background. This sample image data is divided into color components such as red, green and blue, and then each of the color component data is binarized or processed into bi-level color component data. The bi-level color component data generally reveals sufficient contrast and are conducive to generating minimal circumscribing rectangles around character text. The results are merged back into single image data for character recognition where characters are recognized within the circumscribing rectangles. However, the bi-level color component data fails to reveal the characters in the first character row. Since the first character row contains red characters in black background, there is not sufficient contrast in the bi-level color component data.

Similarly, referring to FIG. 2, a conventional method also fails to extract certain color image from a certain color surrounding for image recognition. A sample image has three image portions including a mountain having red portion with a black adjacent surrounding. The second and third image portions have dark images in the white background. This sample image data is divided into color components such as red, green and blue, and then each of the color component data is binarized or processed into bi-level color component data. The bi-level color component data generally reveals sufficient contrast and are conducive to generating minimal circumscribing rectangles around an image portion. The results are merged back into single image data for image recognition where images are recognized within the circumscribing rectangles according to a predetermined method. However, the bi-level color component data fails to separate the mountain from the surrounding. Since the first image portion contains red mountain in black background, there is not sufficient contrast in the bi-level color component data.

Accordingly, a demand for extracting color characters from a colored background or a graphic image is increasing. In particular, the extraction of characters from a background whose color is similar to that of the characters is desired.

SUMMARY OF THE INVENTION

In order to solve the above and other problems, according to a first aspect of the current invention, a method of extracting information from an image, the image having at least a first image portion in a first color, a second image portion in a second color, and a third image portion in a third color, including the steps of a) inputting the image, the first image portion containing the information, the second image portion and the third image portion being background, the second image portion surrounding the first image portion, the third image portion surrounding the second image portion, the first color and the second color having a substantially closer intensity value than the first color and the third color, b) generating a histogram representing a distribution of intensity level, c) determining a temporary threshold value for generating bi-level image data of the image based upon the histogram, the threshold value dividing the intensity distribution into a white side and a black side, d) summing a number of pixels in the white side to generate a first total number, e) summing a number of pixels in the black side to generate a first total number; f) determining a first distribution in the white side based upon the first total number, g) determining a second distribution in the black side based upon the second total number, h) determining a distribution ratio between the first distribution and the second distribution, i) determining the a final threshold value based upon the distribution ratio, j) incrementing the temporary threshold value, and k) repeating the steps d) through k) on a selected portion of the image until a predetermined condition is reached so that the first image portion is separated from the second image portion and the third image portion based upon the bi-level image data.

According to the second aspect of the current invention, a system for extracting information from an image, including an input unit for inputting an image, the image having at least a first image portion in a first color, a second image portion in a second color, and a third image portion in a third color, the first image portion containing the information, the second image portion and the third image portion being background, the second image portion surrounding the first image portion, the third image portion surrounding the second image portion, the first color and the second color having a substantially closer intensity value than the first color and the third color, a bi-level data generation unit connected to the input unit for repeatedly determining a temporary threshold value for generating bi-level image data of on a selected portion of the image based upon the histogram, the bi-level data generation unit repeatedly processing the image based upon the temporary threshold for dividing the intensity distribution into a white side and a black side, the bi-level generation unit summing a first total number of pixels in the white side and a second total number of pixels in the black side, the bi-level data generation unit determining a first distribution in the white side based upon the first total number and a second distribution in the black side upon the second total number, the bi-level generation unit determining a first distribution in the white side and a second distribution in the black side to generate a distribution ratio between the first distribution and the second distribution, the bi-level generation unit determining the final threshold value based upon the distribution ratio, and a minimal circumscribing rectangula unit connected to the bi-level data generation unit for processing the bi-level image data so that the first image portion is separated from the second image portion and the third image portion based upon the bi-level image data, wherein the bi-level data generation unit increments the temporary threshold value and repeatedly processes the selected portion of the image until a predetermined condition is reached so that the first image portion is separated from the second image portion and the third image portion based upon the bi-level image.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 2 is a diagram illustrating a conventional method also fails to extract certain color image from a certain color surrounding for image recognition.

DETAILED DESCRIPTION OF THE PREFERRED EMBODIMENTS(S)

Figure 1:
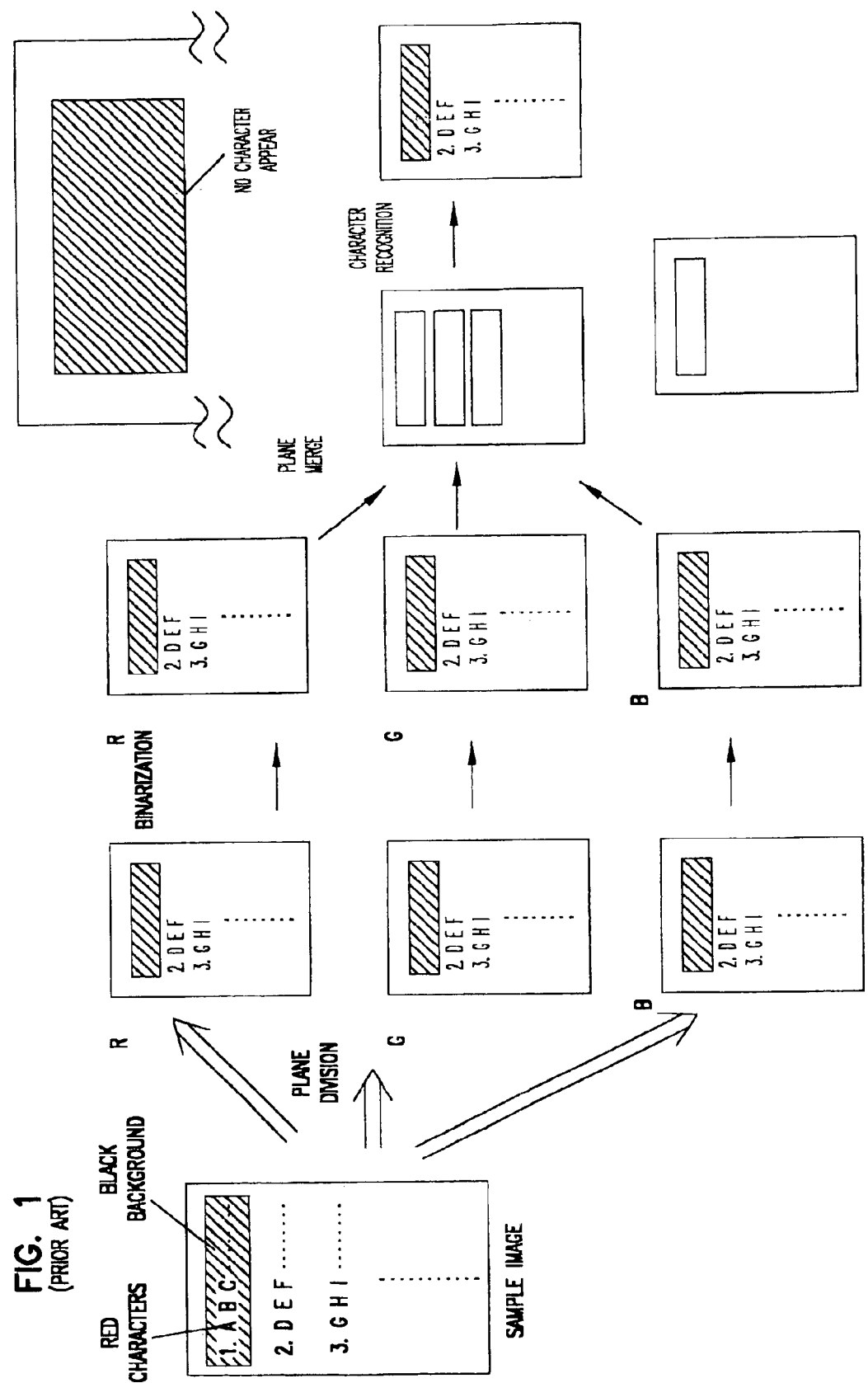
FIG. 1 is a diagram illustrating a conventional method which fails to extract certain color character from a certain color background for character recognition.
Figure 3:
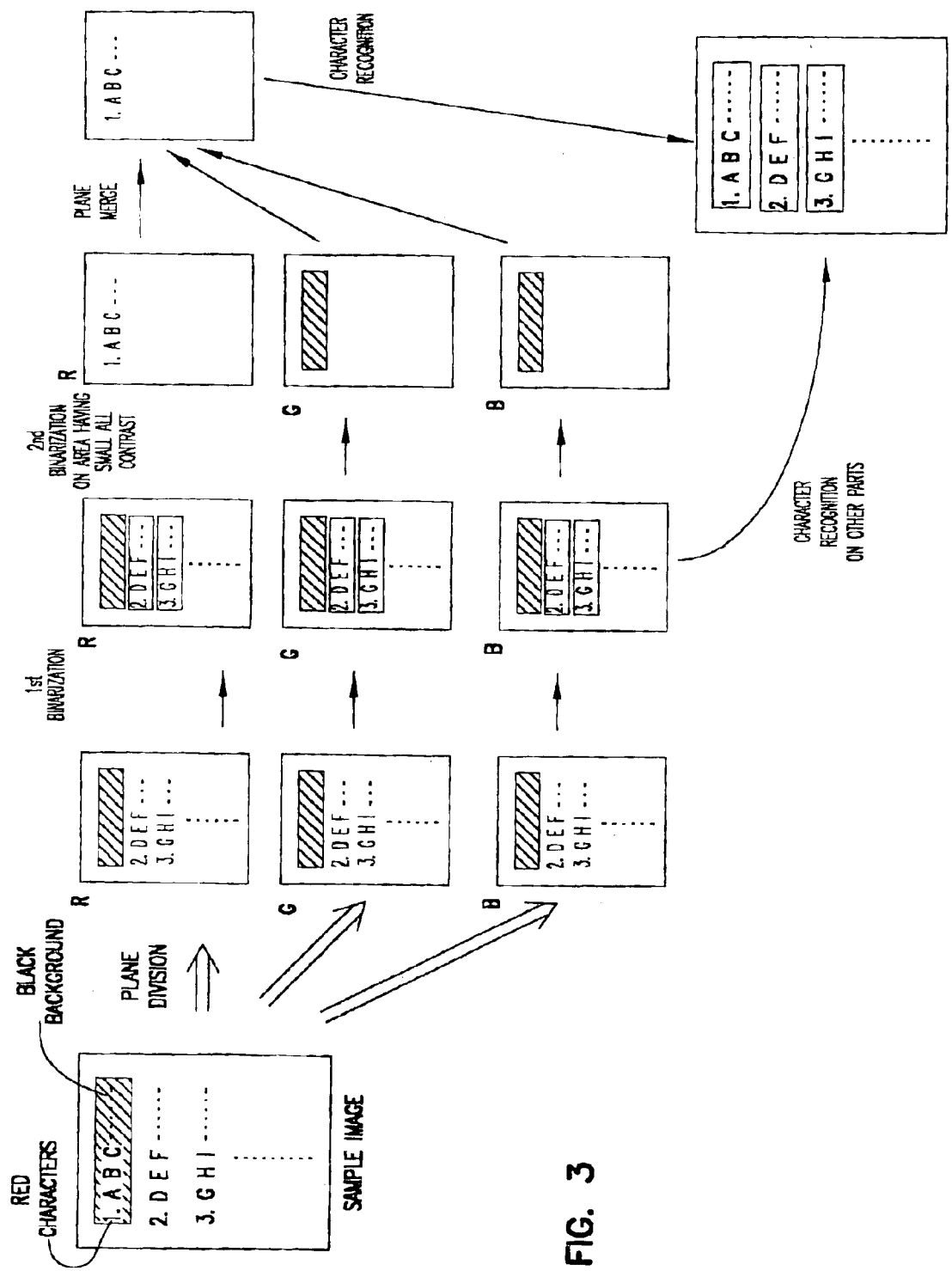
FIG. 3 is a diagram illustrating one preferred method of the color image separation according to the current invention which separates a certain color image from a certain color background.

Referring now to the drawings, wherein like reference numerals designate corresponding structures throughout the views, and referring in particular to FIG. 3, one preferred method of the color image separation according to the current invention enables the separation of a certain color image from a certain color background for recognition. A sample image has three rows of characters including a row one having red characters in a black background. The second and third rows have dark characters in the white background. This sample image data is divided into color components such as red, green and blue, and then each of the color component data is binarized based upon a predetermined bi-level data threshold or is processed into first bi-level color component data. The bi-level color component data generally reveals sufficient contrast and are conducive to generating minimal circumscribing rectangles around character text. The first bi-level color component data for the second and third rows respectively yields character recognition-ready data having a sufficient contrast within the minimal circumscribing rectangles. As shown in each of the first bi-level color component data, the second and third rows are character recognized as "2. DEF" and "3. GHI." On the other hand, the first row first bi-level color component data fails to reveal the characters within the minimal circumscribing rectangle.

Still referring to FIG. 3, only for the first row that fails to show the characters in the first bi-level color compartment data, the preferred method of the color image separation according to the current invention further binarizes the first bi-level color component data based upon a newly adjusted bi-level data threshold and generates the second bi-level color component data. The bi-level data threshold is determined so that the characters are separated from the background within the minimal circumscribing rectangle. This subsequent binarization is repeated as necessary until a desired character set is extracted or for a predetermined number of times. The second bi-level color component data for the red component now separates the originally red characters. The second bi-level color component data of each color component is merged into single image data which undergoes the character recognition. However, optionally the second and the third rows have been character recognized after the first binarization.

Figure 4:
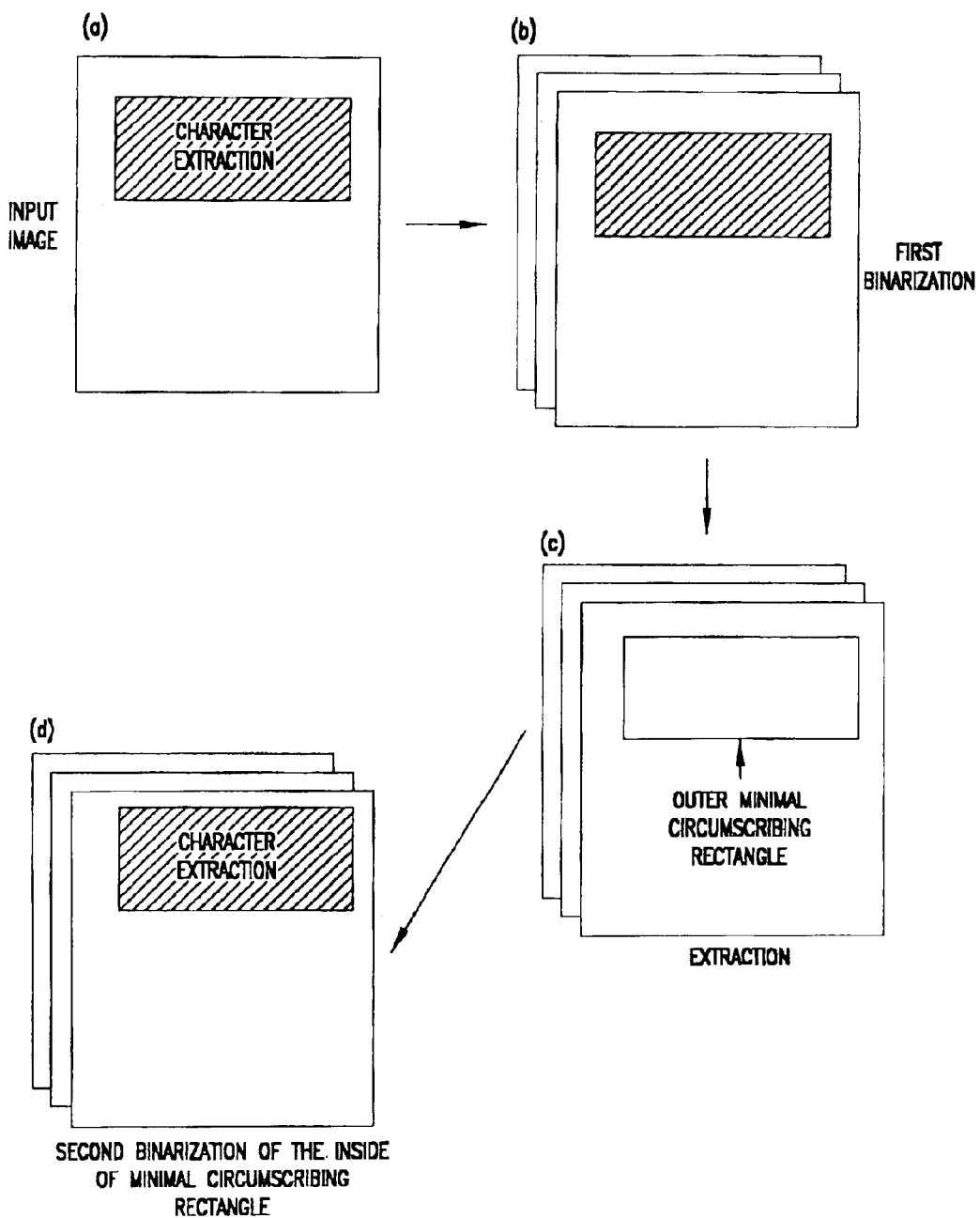
FIG. 4 is a diagram illustrating the preferred method of the image separation according to the current invention processing another image example.

Now referring to FIG. 4, a preferred method of the image separation according to the current invention is illustrated using another example. As shown in 4(a), an input image has a first color background, a character area background in a second color and characters in a third color against the character background. The second color and the third color are similar or whose intensity level is sufficiently close. On the other hand, the first color has a distinct color or whose intensity level is sufficiently different from that of the second and third colors. The image data is divided into a predetermined set of color components such as red, green and blue, and an entire area of each of the color components is binarized into a first bi-level color component data based upon a first threshold values as shown in 4(b). Based upon the first bi-level color component data, minimal circumscribing rectangles are determined on each of the color planes as shown in 4(c). Lastly, only the data corresponding to the minimal circumscribing rectangles is further binarized into a second bi-level color component data based upon a second threshold value as shown in 4(d). This subsequent binarization is repeated as necessary until a desired character set is extracted or for a predetermined number of times. Because the second threshold value is adjusted to separate the second color from the third color, the characters are visibly extracted.

Figure 5:
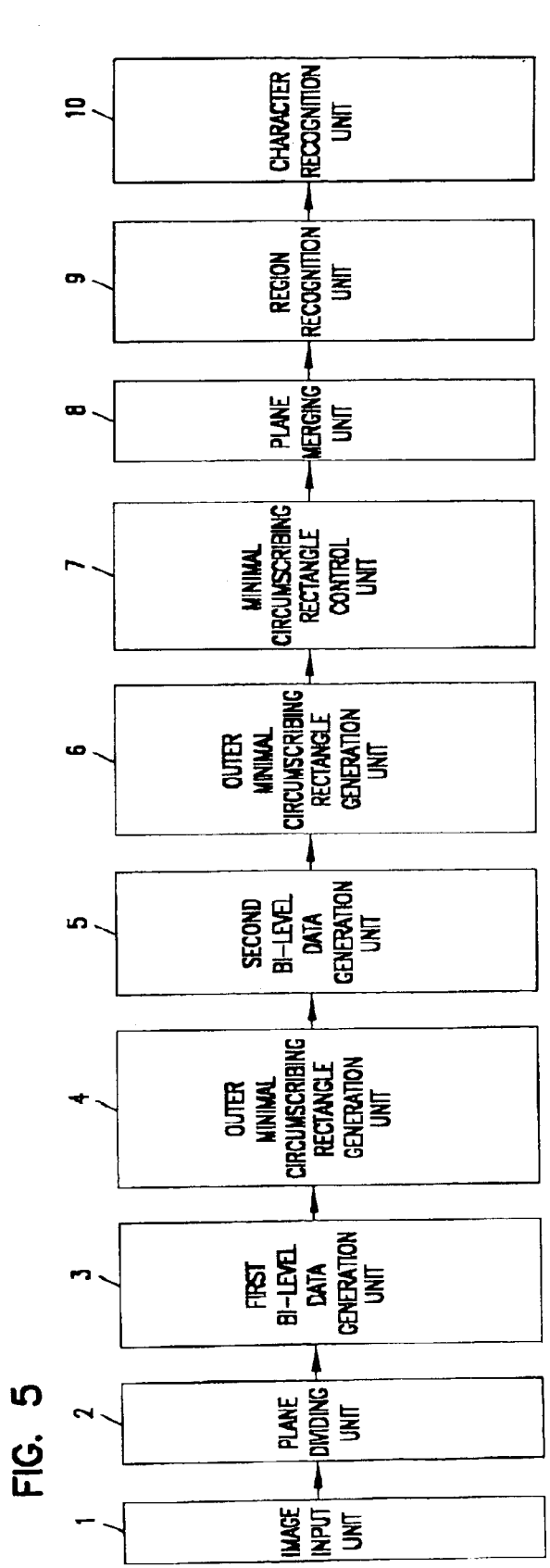
FIG. 5 is a diagram illustrating one preferred embodiment of the character extraction system according to the current invention.

FIG. 5 is a diagram illustrating one preferred embodiment of the character extraction system according to the current invention. The preferred embodiment includes an image input unit 1 for inputting image data, a plane dividing unit 2 for dividing the input image data into a predetermined set of color component data, a first bi-level data generation unit 3 for generating first bi-level color component data for each color component, and an outer minimal circumscribing rectangle generation unit 4 for circumscribing minimal rectangles around each continuous image portion in the first bi-level color component data. The preferred embodiment further includes a second bi-level data generation unit 5 for further binarizing a certain portion or all of the first bi-level color component data for generating second bi-level color component data. The second bi-level data generation unit 5 generally performs the second binarization process for unresolved areas where a desired image portion such as characters are not chromatically isolated from their background or adjacent surroundings. The preferred embodiment also includes an outer minimal circumscribing rectangle regeneration unit 6 for redefining minimal circumscribing rectangles for the second bi-level color component data. Among the minimal circumscribing rectangles, a minimal circumscribing rectangle control unit 7 eliminates a white-run circumscribing rectangle contained by a black-run circumscribing rectangle or a black-run circumscribing rectangle contained by a white-run circumscribing rectangle. After the removal of the above minimal circumscribing rectangles, a plane merging unit 8 merges the color component data into single processed image data. Based upon the processed single image data, a region recognition unit 9 divides the image data into regions such as character regions, image regions and diagram regions for further image processing. A character recognition unit 10 performs character recognition on the selected character regions to recognize characters and generates character code data on the recognized characters.

Figure 6:
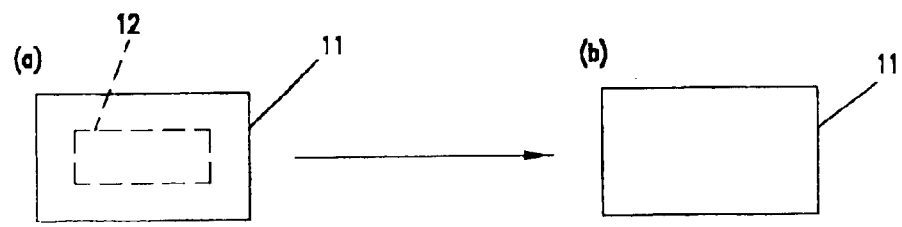
FIGS. 6 and 7 are diagrams illustrating the two situations where certain minimal circumscribing rectangles are removed before the bi-level color component data are merged into the single image data.
Figure 7:
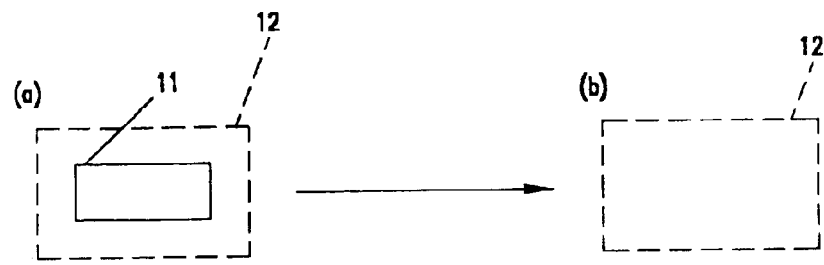

Now referring to FIGS. 6 and 7, diagrams illustrates the two situations where certain minimal circumscribing rectangles are removed before the bi-level color component data are merged into the single image data. FIG. 6 shows that a white-run minimal circumscribing rectangle 12 that is contained in a black-run minimal circumscribing rectangle 11 in 6(a) and the white-run circumscribing rectangle 12 is removed before the color component data is merged into the single image data. Similarly, FIG. 7 shows that a black-run minimal circumscribing rectangle 11 that is contained in a white-run minimal circumscribing rectangle 12 in 7(a) and the black-run circumscribing rectangle 11 is removed before the color component data is merged into the single image data.

Figure 8:
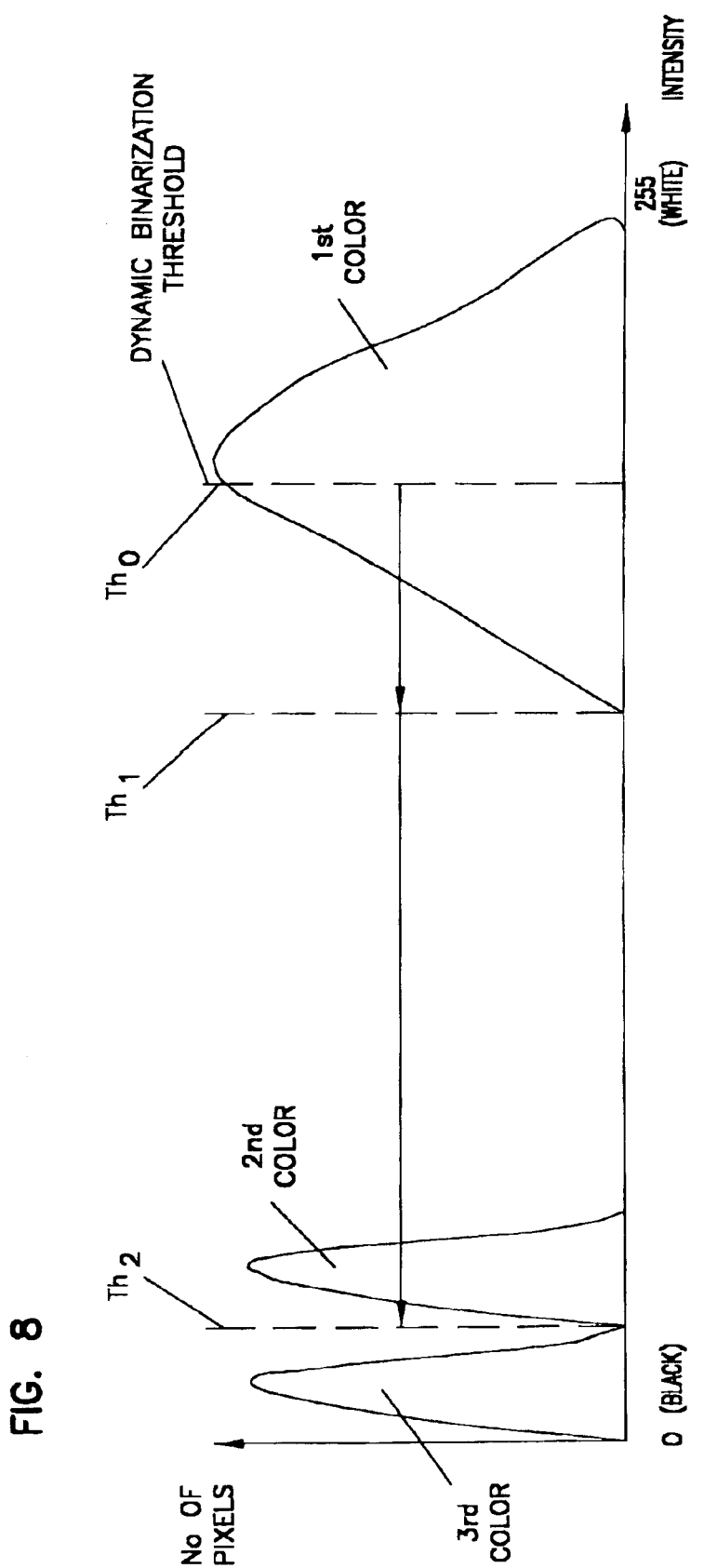
FIG. 8 is a graph illustrating a relationship among threshold values with respect to the colors used in an image.

In order to perform a second or subsequent binarization process, a binarization threshold value is readjusted from an original threshold value to an adjusted threshold value. FIG. 8 is a graph illustrating a relationship among threshold values with respect to the colors used in an image. Assuming that that an image in question includes a first color, a second color and a third color as indicated by the three distinct distributions of a number of pixels across the acrhomatic or gray-scale range. While the first color is substantially light or white, the second and third colors are substantially dark or black. The second and third colors are also substantially close with each other. In order to separate the first color from the second or third color, an original threshold value $TH_1$ is used in binarization. Image data is processed to generate bi-level color component data based upon the threshold value $TH_1$ so that the first color is separated from the second and third colors. However, the use of the original threshold value $TH_1$ fails to separate the second and third colors from each other in the initially binarized image data. In order to isolate the second color from the third color, a threshold value $TH_1$ is adjusted to a second threshold value $TH_2$ so that the second and third colors are chromatically separated in a portion of the initially binarized color component data containing the second and third colors.

Figure 9:
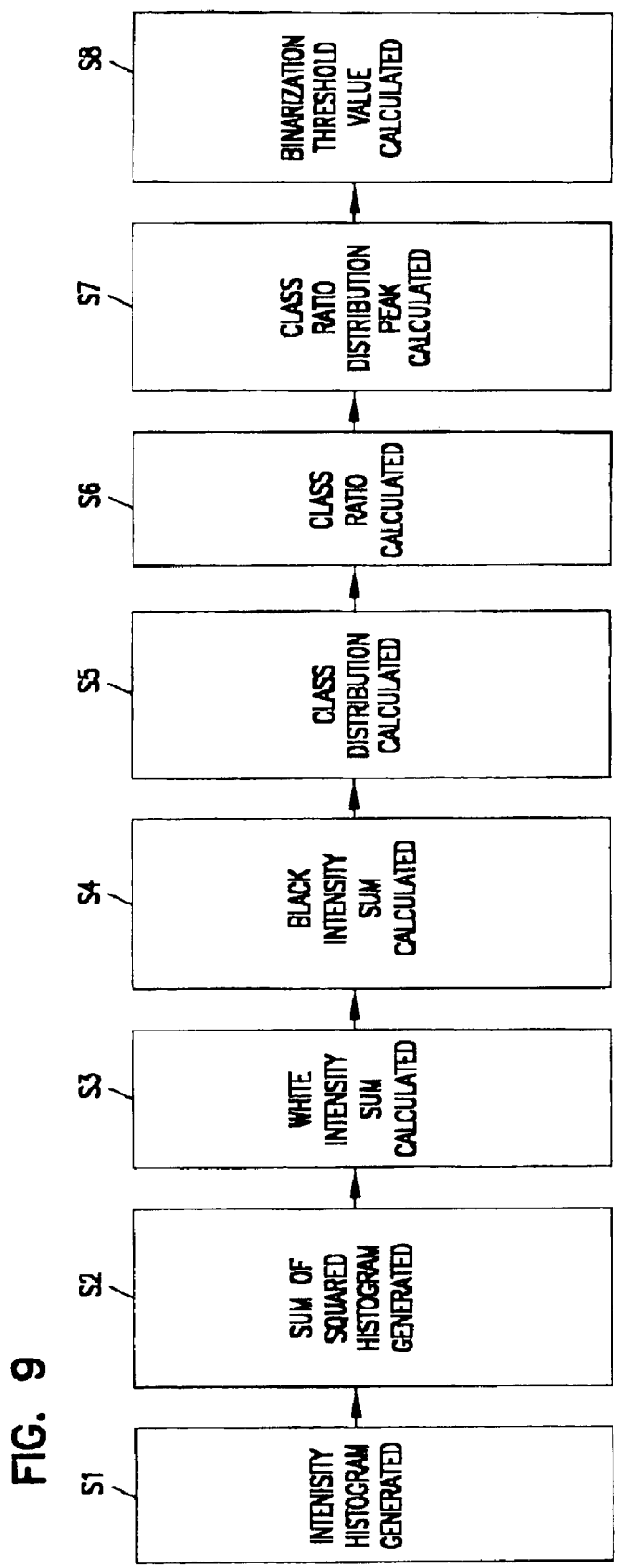
FIG. 9 is a diagram illustrating an exemplary algorithm or a flow of steps involved in determining a threshold used in binarization of image data.

Now referring to FIG. 9, a diagram illustrates an exemplary algorithm or a flow of steps involved in determining a threshold used in binarization of image data. To determine a threshold value to separate colors, in step S1, an intensity distribution histogram is generated. Based upon the intensity distribution histogram, a sum histogram and a sum of squared are generated in step S2. A threshold candidate value is temporary incremented by one from 0 (white) to 255 (black). For each candidate value, a sum on the white side and a sum on the black side, an inner-class or white side distribution as well as an outer-class or black side distribution are respectively calculated in steps S3, S4 and S5. Based upon the above results, a threshold value corresponding to the highest ratio between the outer-class/inner-class distributions in step S6 is considered to be a class ratio distribution peak value in step S7. Finally, the threshold value used in the step S6 is used for the binarization to separate colors in the color extraction system according to the current invention.

Figure 10:
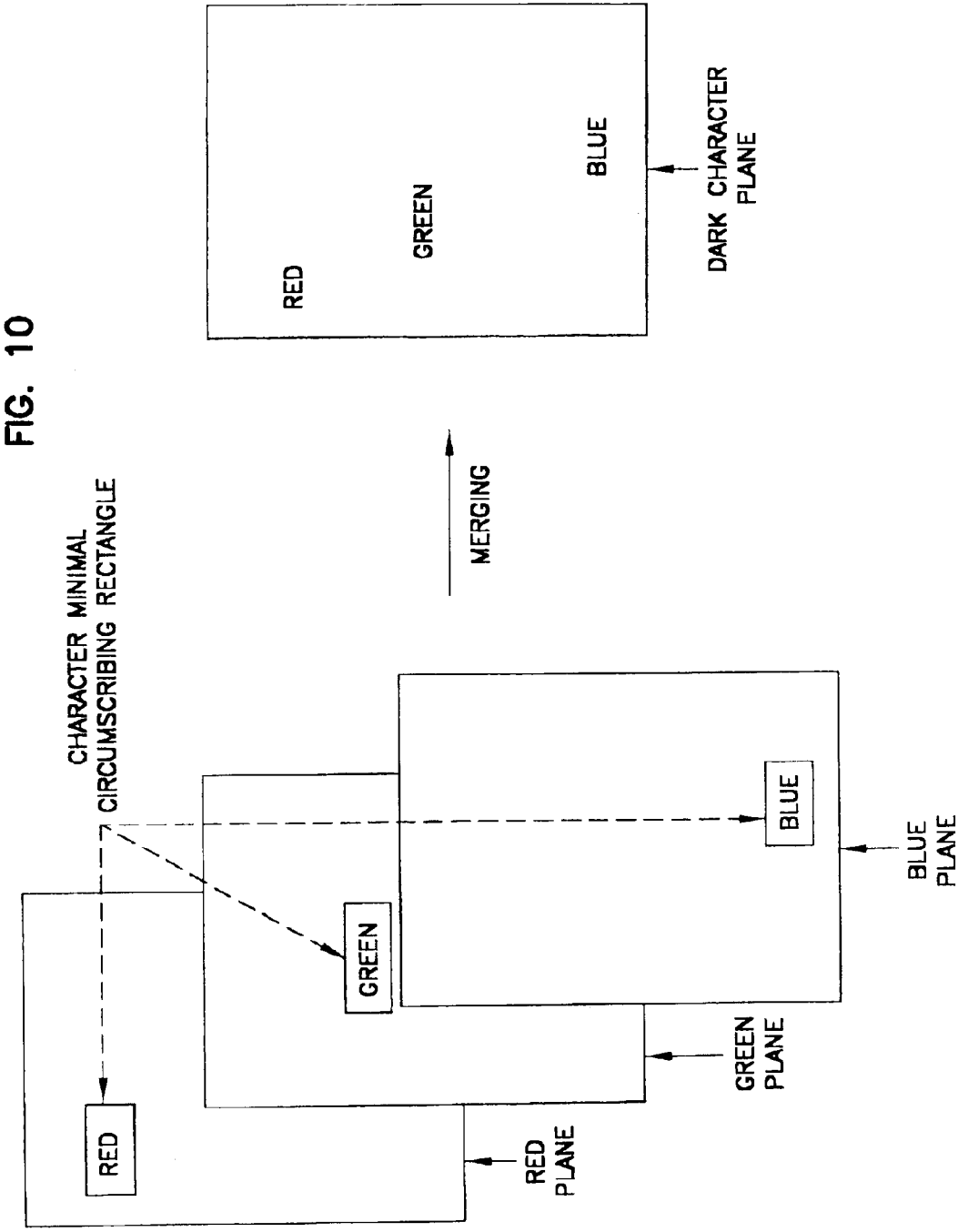
FIG. 10 illustrates a process of merging black characters in color component data based upon logical sum.

FIG. 10 illustrates a process of merging black characters in color component data based upon logical sum. The color component data includes a red component, a green component and a blue component. Pixel R is defined to be a black pixel in a continuous black-run image in a minimal circumscribing rectangle on a red plane or color component data. Pixel G is defined to be a black pixel in a continuous black-run image in a minimal circumscribing rectangle on a green plane or color component data. Pixel B is defined to be a black pixel in a continuous black-run image in a minimal circumscribing rectangle on a blue plane or color component data. Black pixels after the merging of the three color component data are defined to be a logical sum of Pixel R|Pixel G|Pixel B. The merging definition is not limited to the logical sum.

Figure 11:
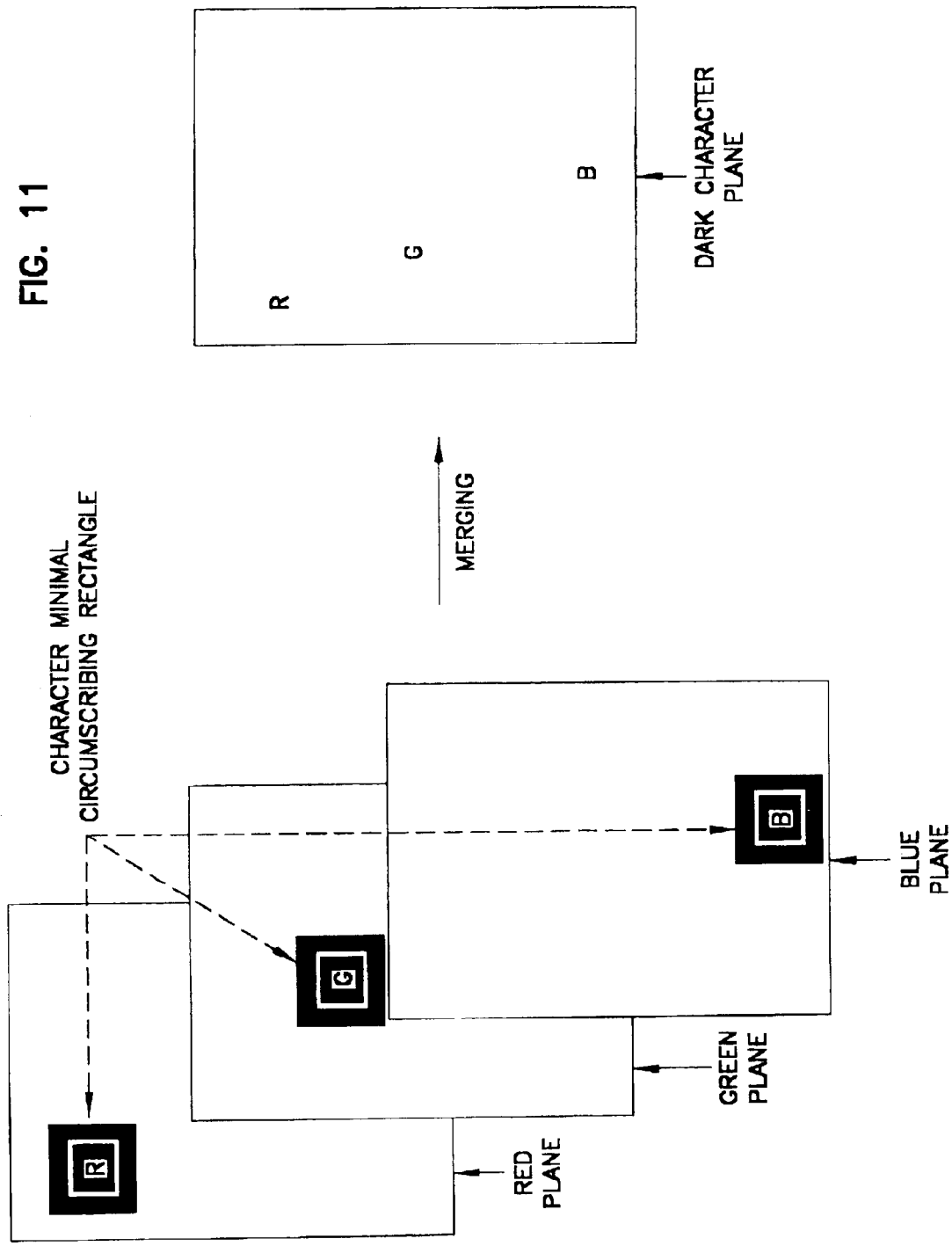
FIG. 11 illustrates a process of merging white characters in color component data based upon logical sum.

FIG. 11 illustrates a process of merging white characters in color component data based upon logical sum. The color component data includes a red component, a green component and a blue component. Pixel R is defined to be a white pixel in a continuous white-run image in a minimal circumscribing rectangle on a red plane or color component data. Pixel G is defined to be a white pixel in a continuous white-run image in a minimal circumscribing rectangle on a green plane or color component data. Pixel B is defined to be a white pixel in a continuous white-run image in a minimal circumscribing rectangle on a blue plane or color component data. White pixels after the merging of the three color component data are defined to be a logical sum of Pixel R|Pixel G|Pixel B. The merging definition is not limited to the logical sum.

Figure 12:
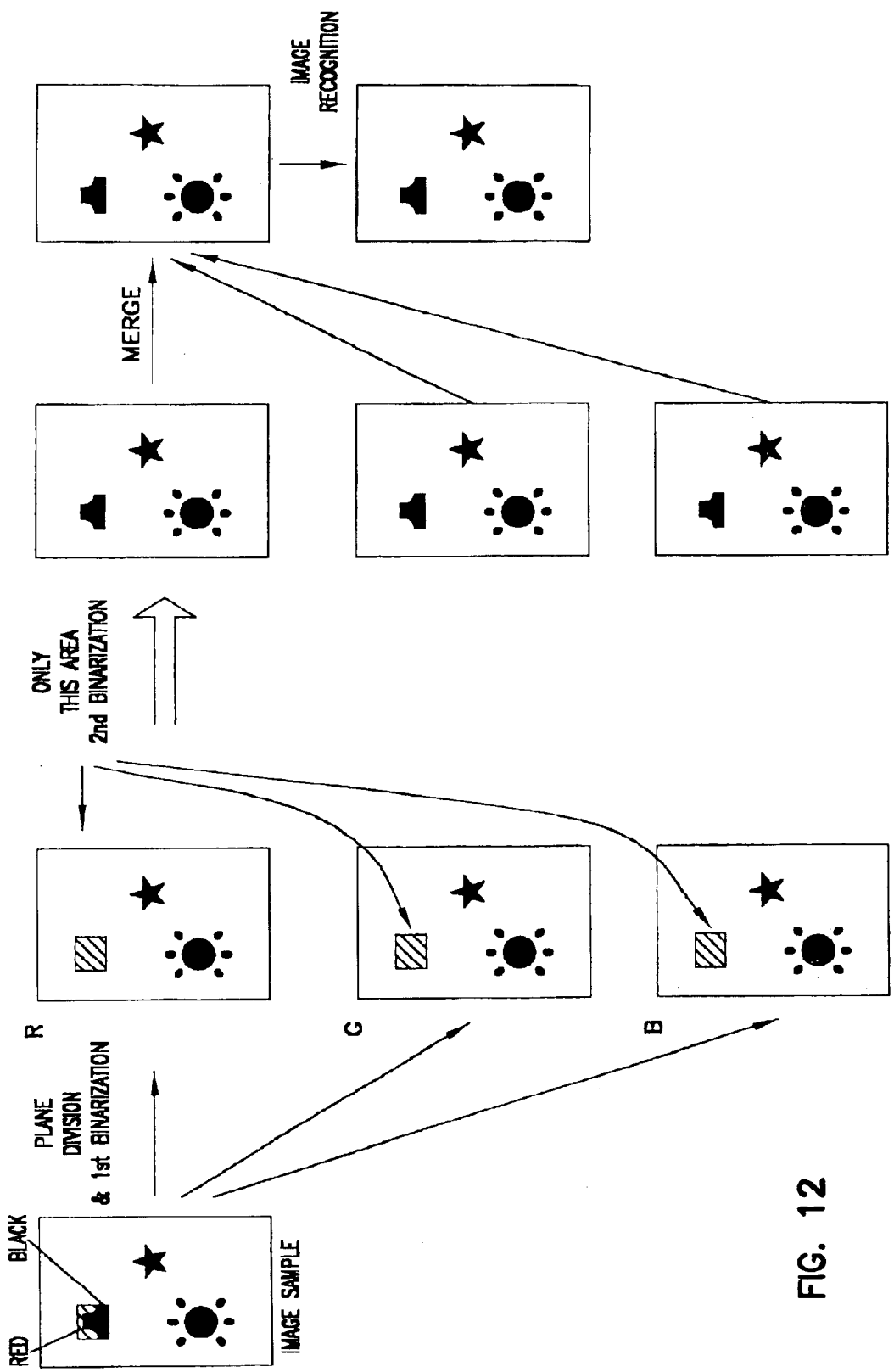
FIG. 12 illustrates a second preferred method of the color image separation according to the current invention that separates of a certain color image from a certain color background for recognition.

Now referring to FIG. 12, a second preferred method of the color image separation according to the current invention enables the separation of a certain color image from a certain color background for recognition. A sample image has three images including a mountain, a star and the sun. The first image has a red mountain portion adjacent to a black surrounding portion while the second and third images have dark images in the white background. This sample image data is divided into color components such as red, green and blue, and then each of the color component data is binarized based upon a predetermined bi-level data threshold or is processed into first bi-level color component data. The bi-level color component data generally reveals sufficient contrast and are conducive to generating minimal circumscribing rectangles around character text. The first bi-level color component data for the second and third images respectively yields image recognition-ready data having a sufficient contrast within the minimal circumscribing rectangles. On the other hand, the first image first bi-level color component data fails to reveal the mountain within the minimal circumscribing rectangle.

Still referring to FIG. 12, only for the first image that fails to show the contour of the mountain in the first bi-level color compartment data, the preferred method of the color image separation according to the current invention further binarizes the first bi-level color component data based upon a newly adjusted bi-level data threshold and generates the second bi-level color component data. The bi-level data threshold is determined so that the characters are separated from the background within the minimal circumscribing rectangle. This subsequent binarization is repeated as necessary until a desired character set is extracted or for a predetermined number of times. The second bi-level color component data for the red component now separates the originally red mountain from the adjacent black surrounding. The second bi-level color component data of each color component is merged into single image data which undergoes the image recognition. However, optionally the second and the third images have been recognized after the first binarization.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of extracting information from an image, the image having at least a first image portion in a first color, a second image portion in a second color, and a third image portion in a third color, comprising the steps of:
   a) inputting the image, the first image portion containing the information, the second image portion and the third image portion being background, the second image portion surrounding the first image portion, the third image portion surrounding the second image portion, the first color and the second color having a substantially closer intensity value than the first color and the third color;
   b) generating a histogram representing a distribution of intensity level;
   c) determining a temporary threshold value for generating bi-level image data of the image based upon the histogram, the threshold value dividing the intensity distribution into a white side and a black side;
   d) summing a number of pixels in the white side to generate a first total;
   e) summing a number of pixels in the black side to generate a second total number;
   f) determining a first distribution in the white side based upon the first total number;
   g) determining a second distribution in the black side based upon the second total number;
   h) determining a distribution ratio between the first distribution and the second distribution; and
   i) determining a final threshold value based upon the distribution ratio;
   j) incrementing the temporary threshold value; and
   k) repeating said steps d) through j) on a selected portion of the image until a predetermined condition is reached so that the first image portion is separated from the second image portion and the third image portion based upon the bi-level image data.

2. The method of extracting information from an image according to claim 1 wherein the image is divided into bit planes based upon a predetermined set of color components before each of the divided color components undergoes said steps b), c), d), and e) and the bit planes are merged back.

3. The method of extracting information from an image according to claim 1 wherein the information is characters.

4. The method of extracting information from an image according to claim 1 wherein the information is graphical.

5. The method of extracting information from an image according to claim 1 wherein said step e) is performed only on an area containing the first image portion.

6. The method of extracting information from an image according to claim 1 wherein said first image portion is identified in a minimal circumscribing rectangle.

7. The method of extracting information from an image according to claim 6 wherein said predetermined condition is to detect character circumscribing rectangles in the minimal circumscribing rectangle.

8. The method of extracting information from an image according to claim 1 wherein the intensity level distribution is shown in a multiplication product of a squared intensity value and a number of corresponding pixels.

9. The method of extracting information from an image according to claim 1 wherein a temporary threshold value is repeatedly assigned to find a maximal ratio.

10. A system for extracting information from an image, comprising:
   an input unit for inputting an image, the image having at least a first image portion in a first color, a second image portion in a second color, and a third image portion in a third color, the first image portion containing the information, the second image portion and the third image portion being background, the second image portion surrounding the first image portion, the third image portion surrounding the second image portion, the first color and the second color having a substantially closer intensity value than the first color and the third color;
   a bi-level data generation unit connected to said input unit for repeatedly generating a histogram representing a distribution of intensity level and for repeatedly determining a temporary threshold value for generating bi-level image data of on a selected portion of the image based upon the histogram, said bi-level data generation unit repeatedly processing the image based upon the temporary threshold for dividing the intensity distribution, into a white said and a black side, said bi-level generation unit summing a first total number of pixels in the white side and a second total number of pixels in the black side, said bi-level data generation unit determining a first distribution in the white side based upon the first total number and a second distribution in the black side based upon the second total number, said bi-level data generation unit determining a first distribution in the white side and a second distribution in the black side to generate a distribution ratio between the first distribution and the second distribution, said bi-level data generation unit determining a final threshold value based upon the distribution ratio; and a minimal circumscribing rectangular unit connected to said bi-level data generation unit for processing said bi-level image data wherein said bi-level data generation unit increments the temporary threshold value and repeatedly processes the selected portion of the image until a predetermined condition is reached so that the first image portion is separated from the second image portion and the third image portion based upon the bi-level image.

11. The system for extracting information from an image according to claim 10 further comprising:

a plane dividing unit connected to said input unit for dividing the image into bit planes based upon a predetermined set of color components; and a plane merging unit connected to said minimal circumscribing rectangular unit for merging said bit planes.

12. The system for extracting information from an image according to claim 10 wherein the information is characters.

13. The system for extracting information from an image according to claim 10 wherein the information is graphical.

14. The system for extracting information from an image according to claim 10 wherein said bi-level data generation unit performs only on an area containing the first image portion.

15. The system for extracting information from an image according to claim 10 wherein said first image portion is identified in a minimal circumscribing rectangle.

16. The system for extracting information from an image according to claim 15 wherein said minimal circumscribing rectangular unit further detects character circumscribing rectangles in the minimal circumscribing rectangle.

17. The system for extracting information from an image according to claim 10 wherein said bi-level data generation unit generates the histogram for a squared intensity value and a number of corresponding pixels.

18. The system for extracting information from an image according to claim 10 wherein said bi-level data generation unit assigns a temporary threshold value to find a maximal ratio.

* * * * *